US009473865B2

(12) United States Patent
Thormundsson et al.

(10) Patent No.: US 9,473,865 B2
(45) Date of Patent: Oct. 18, 2016

(54) INTEGRATED MOTION DETECTION USING CHANGES IN ACOUSTIC ECHO PATH

(71) Applicant: Conexant Systems, Inc., Newport Beach, CA (US)

(72) Inventors: Trausti Thormundsson, Irvine, CA (US); Ragnar H. Jonsson, Laguna Niguel, CA (US); Youhong Lu, Irvine, CA (US); Govind Kannan, Irvine, CA (US); Sverrir Olafsson, Newport Beach, CA (US)

(73) Assignee: CONEXANT SYSTEMS, INC., Irvine, CA (US)

( * ) Notice: Subject to any disclaimer, the term of this patent is extended or adjusted under 35 U.S.C. 154(b) by 482 days.

(21) Appl. No.: 13/783,074

(22) Filed: Mar. 1, 2013

(65) Prior Publication Data

US 2013/0230180 A1  Sep. 5, 2013

Related U.S. Application Data

(60) Provisional application No. 61/605,667, filed on Mar. 1, 2012.

(51) Int. Cl.

| | | |
|---|---|---|
| *G10K 11/16* | (2006.01) | |
| *H04R 29/00* | (2006.01) | |
| *G01S 15/02* | (2006.01) | |
| *G01S 15/52* | (2006.01) | |
| *H04S 7/00* | (2006.01) | |

(52) U.S. Cl.
CPC ............ *H04R 29/00* (2013.01); *G01S 15/025* (2013.01); *G01S 15/526* (2013.01); *H04R 2499/13* (2013.01); *H04S 7/00* (2013.01); *H04S 2400/13* (2013.01)

(58) Field of Classification Search
CPC .................................. H04R 29/00; H04R 1/00
USPC ................... 381/56, 92, 66, 71.1; 455/556.1
See application file for complete search history.

(56) References Cited

U.S. PATENT DOCUMENTS

| | | | |
|---|---|---|---|
| 5,361,070 A | 11/1994 | McEwan | |
| 5,463,618 A * | 10/1995 | Furukawa ............. | H04M 9/082 370/290 |
| 5,640,143 A | 6/1997 | Myron et al. | |
| 5,966,090 A | 10/1999 | McEwan | |
| 6,185,300 B1 * | 2/2001 | Romesburg ............. | H04M 9/08 370/290 |
| 6,434,110 B1 * | 8/2002 | Hemkumar ................... 370/201 | |
| 6,570,983 B1 * | 5/2003 | Speeney ............... | H04M 1/578 379/373.02 |
| 7,035,397 B2 * | 4/2006 | Diethorn ............... | H04M 9/082 379/406.01 |
| 7,039,197 B1 * | 5/2006 | Venkatesh et al. ............. 381/86 | |
| 7,171,003 B1 * | 1/2007 | Venkatesh et al. ............. 381/66 | |
| 7,760,425 B2 * | 7/2010 | Epple .................. | G02B 17/0892 359/349 |
| 7,991,163 B2 * | 8/2011 | Loether ............................ 381/26 | |
| 8,090,115 B2 * | 1/2012 | Noto ................................ 381/77 | |

(Continued)

FOREIGN PATENT DOCUMENTS

WO  2008/090504  7/2008

*Primary Examiner* — William Deane, Jr.
(74) *Attorney, Agent, or Firm* — Haynes and Boone, LLP

(57) ABSTRACT

A system for detecting motion comprising a first speaker, a first microphone separated from the first speaker by a distance D1, a sound generator, an echo parameter measurement device and an echo parameter monitor, wherein the echo parameter monitor stores two or more sequential echo parameters and generates a motion indicator if the two or more sequential echo parameters indicate a change in an acoustic echo path that exceeds a predetermined threshold.

20 Claims, 2 Drawing Sheets

(56) References Cited

U.S. PATENT DOCUMENTS

| | | | |
|---|---|---|---|
| 8,275,145 B2 * | 9/2012 | Buck et al. .................... 381/86 |
| 8,625,775 B2 * | 1/2014 | Bhaskar ................ H04M 9/082 |
| | | 379/406.01 |
| 8,693,678 B2 * | 4/2014 | Lindstrom ............ H04M 9/082 |
| | | 379/406.02 |
| 8,750,491 B2 * | 6/2014 | Prakash ................ H04M 9/082 |
| | | 379/406.05 |
| 9,001,994 B1 * | 4/2015 | Yang ..................... H04B 3/237 |
| | | 379/406.08 |
| 9,146,630 B2 * | 9/2015 | Choi ....................... G06F 3/041 |
| 2005/0026652 A1 * | 2/2005 | Kawamura ......... H04M 1/0247 |
| | | 455/556.1 |
| 2005/0136977 A1 * | 6/2005 | Levy ..................... H04B 1/385 |
| | | 455/557 |
| 2008/0091415 A1 * | 4/2008 | Schafer ............... G10L 19/0208 |
| | | 704/200.1 |
| 2011/0033059 A1 * | 2/2011 | Bhaskar ................ H04M 9/082 |
| | | 381/71.4 |
| 2011/0175718 A1 * | 7/2011 | Inoue ........................... 340/463 |
| 2013/0129102 A1 * | 5/2013 | Li ......................... H04M 9/082 |
| | | 381/71.1 |
| 2013/0156209 A1 * | 6/2013 | Visser ................... H04M 1/035 |
| | | 381/66 |
| 2013/0230186 A1 * | 9/2013 | Li ............................. H04R 3/00 |
| | | 381/92 |
| 2014/0016794 A1 * | 1/2014 | Lu ........................... H04R 3/02 |
| | | 381/66 |
| 2014/0270149 A1 * | 9/2014 | Xu ........................ H04M 9/082 |
| | | 379/406.08 |
| 2014/0270275 A1 * | 9/2014 | Niedzwiedz et al. ........ 381/190 |

* cited by examiner

INTEGRATED MOTION DETECTION USING CHANGES IN ACOUSTIC ECHO PATH

RELATED APPLICATIONS

The present application claims benefit of U.S. Provisional application 61/605,667, filed Mar. 1, 2012, which is hereby incorporated by reference as if set forth herein in its entirety for all purposes, and is related to U.S. patent application Ser. No. 12/684,829, "Systems and Methods for Echo Cancellation and Echo Suppression," filed Jan. 8, 2010.

TECHNICAL FIELD

The present disclosure pertains to motion detectors, and more specifically to a motion detector for an audio device that uses a microphone and speaker of the audio device to generate signals for use by the motion detector.

BACKGROUND OF THE INVENTION

Motion detectors typically use light or sound to detect motion within a predetermined area. Such motion detectors are typically dedicated devices, or are stand-alone peripherals that generate a data signal indicative of whether motion has been detected.

SUMMARY OF THE INVENTION

An integrated motion detector for use with an audio system is disclosed. The integrated motion detector allows the speakers and microphone of an audio system to be used to detect whether motion has occurred, such as by measuring residual echo changes or echo canceller impulse response changes. The audio system can then use the detected motion to perform a predetermined function, to generate a notification or for other suitable purposes.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
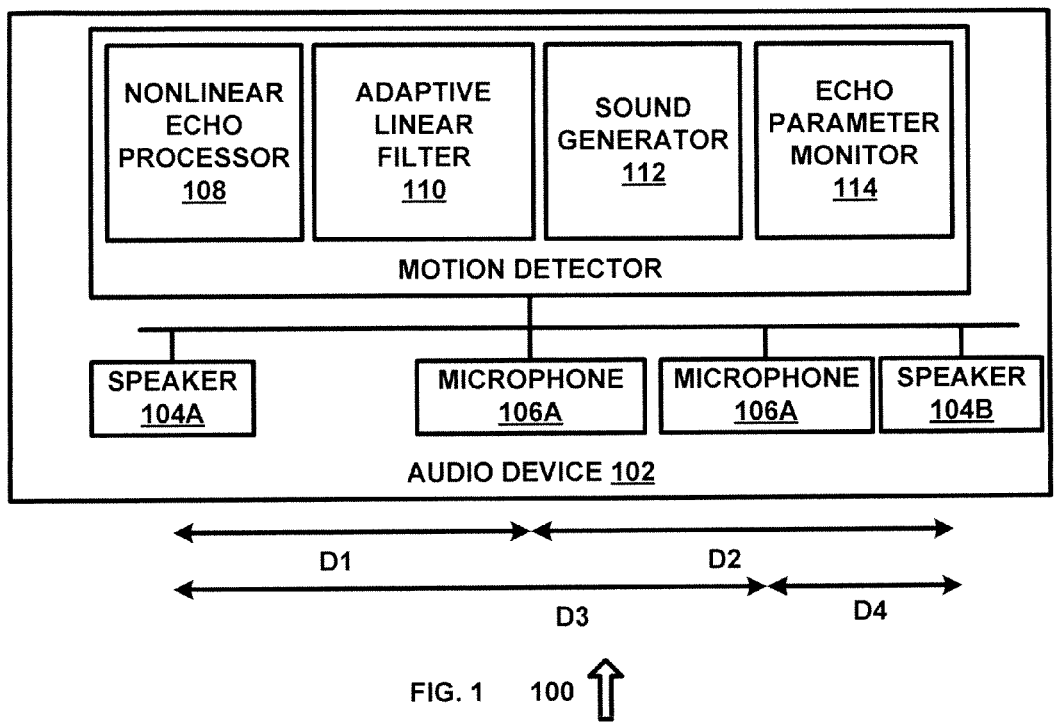
FIG. 1 is a diagram of a system for detecting motion using an embedded audio system in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

In an audio device, such as a personal computer, television, information terminal or vending machine, the ability to detect movement in the room or near the audio device can be of value. The present disclosure allows movement detection using existing speakers and microphones of audio devices without adding any additional costs for hardware components, such as a dedicated motion detector.

In general, the acoustic echo path of an enclosed space such as a room is sensitive to changes in the dimensions of the room, such as the opening or closing of doors or windows, or the movement of items within the room, such as furniture or persons. This sensitivity increases as the distance between the loudspeaker and the microphone increases. For example, in television applications, the microphones and loudspeakers are typically located far apart relative to other devices. This configuration can be used to measure residual echo changes, echo canceller impulse response changes or other suitable changes when a door or window is opened or closed, when there is movement of people or objects within the room, or when other types of motion occur. The proximity of the motion with relation to the device can also be determined. The present disclosure includes systems and algorithms that monitor residual echo, echo canceller impulse response or other suitable echo parameters and analyze the changes over time to determine whether there is movement in a room or other space. The movement and/or proximity information can then be used to enhance user interaction with the audio system, to generate notification, or for other suitable purposes.

In one exemplary embodiment, the present disclosure can generate an audio signal, such as an impulse response, music, ambient sounds, white noise or other suitable audio signals. By tracking the change in echo canceller coefficients, changes in the room acoustic characteristics can be detected.

In another exemplary embodiment, the proximity of the movement can be detected, such as by determining from the acoustic echo path parameters whether the motion is close to or far away from the audio system. In this exemplary embodiment, content or display user interface options can be modified when a user approaches a television or audio system, a voice recognition engine can be activated, or other suitable functions can be provided. Likewise, motion-related control functionality can be provided for intercom systems, elevator controls, vending machine controls or other devices.

The proximity of the movement can be determined by examining the change in echo canceller taps. Each tap corresponds to a certain "traveling time" for the echo sound wave, such that a change in the early reflection echo path can be used to determine if the movement is in close proximity.

FIG. 1 is a diagram of a system 100 for detecting motion using an embedded audio system in accordance with an exemplary embodiment of the present disclosure. System 100 includes audio device 102, speakers 104A and 104B, microphones 106A and 106B, nonlinear echo processor 108, adaptive linear filter 110, sound generator 112 and echo parameter monitor 114, which can be implemented in hardware or a suitable combination of hardware and software. As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

Audio device 102 can be a stereo system, a television, an audio system of a personal computer, an audio system of an information terminal or vending machine or other suitable devices. Audio device 102 includes speakers 104A and 104B and microphones 106A and 106B, although an audio device with only a single speaker or a single microphone can be used, as well as audio devices with multiple speakers, multiple microphones, or other suitable combinations of sound generating devices and sound sensing devices. Microphone 106A is physically separated from speaker 104A by a distance D1, and is physically separated from speaker 104B by a distance D2. The distances D1 and D2 can be the same or different, such as where microphone 106 is located on one side of the enclosure of audio device 102. Likewise, microphone 106B is physically separated from speaker 104A by a distance D3, and is physically separated from speaker 104B by a distance D4. The distances D3 and D4 can be the same or different, and distances D1, D2, D3 and D4 can likewise each be the same, can each be different, or can have other suitable combinations.

Nonlinear echo processor 108 suppresses the residual echo signal, such as by using the processes disclosed in U.S. patent application Ser. No. 12/684,829, "Systems and Methods for Echo Cancellation and Echo Suppression," filed Jan. 8, 2010, which is hereby incorporated by reference as if set forth herein in its entirety for all purposes. The echo path gain estimate from the nonlinear echo suppressor can be used as input to echo parameter monitor 114. Adaptive linear filter 110 generates echo parametric data such as linear filter parameters in response to an input audio signal, such as an impulse response, as also disclosed in U.S. patent application Ser. No. 12/684,829. The linear filter parameters from the acoustic echo can be used as in input to echo parameter monitor 114. Nonlinear echo processor 108 and adaptive liner filter 110 can be implemented in the time domain or frequency domain or in other suitable manners.

Sound generator 112 can generate an audio signal for use in measuring the echo characteristics of a room or other space. In one exemplary embodiment, sound generator 112 can generate music, white noise, ambient noise, an impulse response, test signals or other suitable audio signals. Sound generator 112 can generate the audio signal upon receipt of a command from echo parameter monitor 114 or other suitable systems, can modify an audio signal from an external source to include the audio signal for use by nonlinear echo processor 108 or adaptive linear filter 110, or can perform other suitable functions. In other applications, sound generator 112 can generate audio signals that are part of normal operations of the device, such as audio signals that are part of TV programs, music content played on a car radio, or other suitable audio signals.

Echo parameter monitor 114 receives data from nonlinear echo processor 108, adaptive linear filter 110, or other suitable systems or devices and generates control data, notification data or other suitable data to indicate that motion has been detected. In one exemplary embodiment, echo parameter monitor 114 can receive control data from a user interface or other suitable systems that activates echo parameter monitor 114, which can generate control data to initiate sound generation by sound generator 112 and monitoring by nonlinear echo processor 108 or adaptive linear filter 110 for changes in the acoustic echo path between one or more speakers and one or more microphones. If a change is detected, such as a change that exceeds a threshold level, then control data can be generated by echo parameter monitor 114, such as to activate a system (such as a video recorder, an audio recorder, or a camera), to perform a function (such as in conjunction with a screen display on a graphic user interface, remote control commands or audio commands), or for other suitable purposes.

In operation, system 100 monitors the acoustic echo path between one or more microphones and one or more speakers to determine whether an object within a space has moved, and to determine the proximity of the movement with respect to the device, whether the configuration of the space has changed, or for other suitable purposes. System 100 uses existing speakers of an audio system to generate an audio signal that is measured by an existing microphone or microphones of the audio system to detect motion or configuration changes, so as to provide enhanced user features for the audio system or other suitable functionality.

In one exemplary embodiment, system 100 can be deployed within an automobile or other vehicle, and can detect a change in the configuration of the passenger compartment, such as the opening of a door or window. In this exemplary embodiment, system 100 can generate data signals or control data to activate a display that notifies the driver that a car door or window has been opened, to reduce or increase the volume of an audio system, to modify a setting of a climate control system, to modify equalization of the audio device to provide the same listening experience with windows open or closed, with more or less people in the car, or for other suitable purposes.

In another exemplary embodiment, system 100 can be deployed in a television set and can detect motion within a room, the entry or exit of a person from a room, the opening or closing of a door or window, or other suitable changes. In this exemplary embodiment, system 100 can generate data signals or control data to activate a control on a user interface of a television set that allows the viewer to activate controls with subsequent movements (waving a hand, issuing a verbal command), to activate a camera (for use with a security system), to modify a setting of the television (such as volume settings), or for other suitable purposes.

Figure 2:
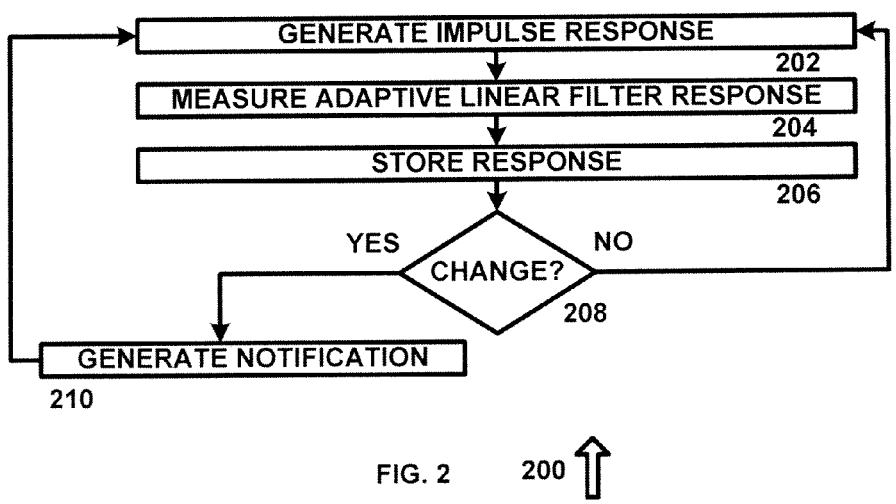
FIG. 2 is a flow chart of an algorithm for detecting motion or changes in the configuration of a space in accordance with an exemplary embodiment of the present disclosure.

FIG. 2 is a flow chart of an algorithm 200 for detecting motion or changes in the configuration of a space in accordance with an exemplary embodiment of the present disclosure. Algorithm 200 can be implemented in hardware or a suitable combination of hardware and software, such as using one or more software systems operating as firmware in conjunction with the operating system of a television system, audio system or other suitable systems.

Algorithm 200 begins at 202, where an impulse response is generated. In one exemplary embodiment, an electronic timer can be used to periodically generate control data at a predetermined interval to cause an electronic sound generator to generate an audio signal at one or more speakers and to activate an electronic echo canceller system to measure a response at one or more microphones. In another exemplary embodiment, a sequence of audio signals can be generated at two or more speakers, and the response can be measured at one or more microphones. Likewise, an audio signal can be generated at a single speaker and measured at two or more microphones. The algorithm then proceeds to 204.

At 204, an adaptive linear filter response is measured, such as to determine one or more adaptive linear filter parameters that would normally be applied to the received signal to cancel an echo component of the received signal as compared to the transmitted audio signal. The algorithm then proceeds to 206, where the adaptive linear filter response data is stored in an electronic data storage media, such as a table, data register or data buffer. The algorithm then proceeds to 208.

At 208, it is determined whether a change in the adaptive linear response data has occurred that exceeds a predetermined threshold. In one exemplary embodiment, the change can be a change of greater than a predetermined percentage from a single prior filter parameter, a change of greater than a predetermined threshold from a plurality of filter parameters, a change in one or more filter parameters over three or more successive measurements, or changes in other suitable echo canceller parameters can be monitored. If it is determined that a change has occurred, the algorithm proceeds to 210, where a notification or other suitable data is generated. In one exemplary embodiment, the notification can be a user prompt, control data for a control system (such as for audio settings or camera controls), a response to a prompt generated on a user interface, or other suitable data. The algorithm then returns to 202. If it is determined that no change has occurred that exceeds a predetermined threshold, the algorithm returns to 202.

In operation, algorithm 200 allows adaptive linear filter parameters such as filter coefficients to be monitored over time to determine whether a change has occurred that indicates that movement has occurred within a room or space, that the dimensions of the room or space have changed, or that other suitable changes have occurred, so as to allow the motion or dimension change event to be used for triggering additional functions, as input for user controls, or for other suitable purposes.

Figure 3:
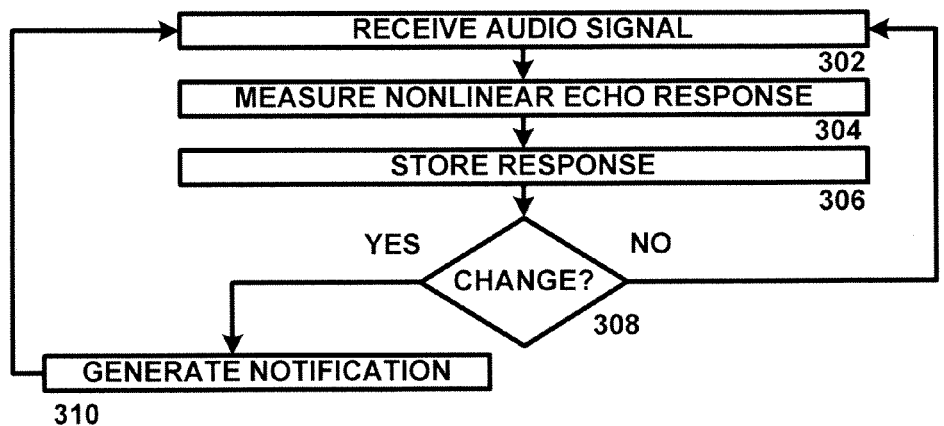
FIG. 3 is a flow chart of an algorithm for detecting motion or changes in the configuration of a space in accordance with an exemplary embodiment of the present disclosure.

FIG. 3 is a flow chart of an algorithm 300 for detecting motion or changes in the configuration of a space in accordance with an exemplary embodiment of the present disclosure. Algorithm 300 can be implemented in hardware or a suitable combination of hardware and software, such as using one or more software systems operating as firmware in conjunction with the operating system of a television system, audio system or other suitable systems.

Algorithm 300 begins at 302, where an audio signal is generated. In one exemplary embodiment, an electronic timer can be used to periodically generate control data at a predetermined interval to cause an electronic sound generator to generate an audio signal at one or more speakers and to activate a nonlinear echo response system to measure a response at one or more microphones. In another exemplary embodiment, a sequence of audio signals can be generated at two or more speakers, and the response can be measured at one or more microphones. Likewise, an audio signal can be generated at a single speaker and measured at two or more microphones. The algorithm then proceeds to 304.

At 304, a nonlinear echo response is measured, such as to determine one or more nonlinear echo canceller parameters that would normally be applied to the received signal to cancel an echo component of the received signal as compared to the transmitted audio signal. The algorithm then proceeds to 306, where the nonlinear echo response data is stored in an electronic data storage media, such as a table, data register or data buffer. The algorithm then proceeds to 308.

At 308, it is determined whether a change in the nonlinear echo response data has occurred that exceeds a predetermined threshold. In one exemplary embodiment, the change can be a change of greater than a predetermined percentage from a single nonlinear echo response parameter, a change of greater than a predetermined threshold from a plurality of nonlinear echo response parameters, a change in one or more nonlinear echo response parameters over three or more successive measurements, or changes in other suitable nonlinear echo response parameters can be monitored. If it is determined that a change has occurred, the algorithm proceeds to 310, where a notification or other suitable data is generated. In one exemplary embodiment, the notification can be a user prompt, control data for a control system (such as for audio settings or camera controls), a response to a prompt generated on a user interface, or other suitable data. The algorithm then returns to 302. If it is determined that no change has occurred that exceeds a predetermined threshold, the algorithm returns to 302.

In operation, algorithm 300 allows nonlinear echo response parameters to be monitored over time to determine whether a change has occurred that indicates that movement has occurred within a room or space, that the dimensions of the room or space have changed, or that other suitable changes have occurred, so as to allow the motion or dimension change event to be used for triggering additional functions, as input for user controls, or for other suitable purposes.

Figure 4:
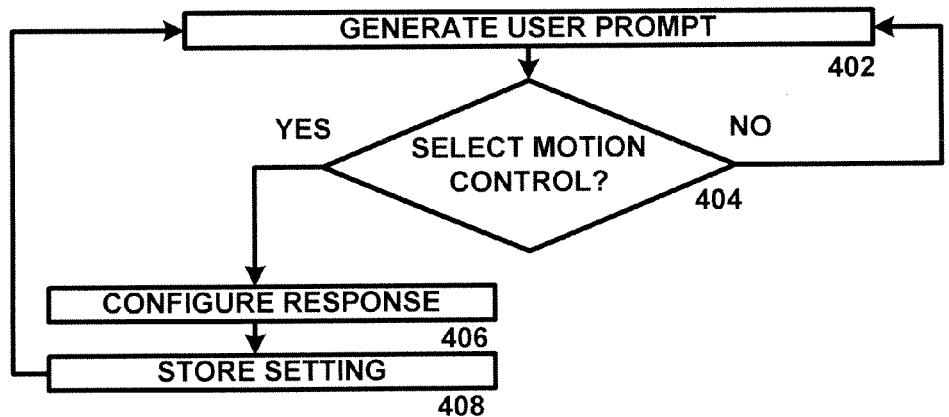
FIG. 4 is a flow chart of an algorithm for using detected motions to perform selected functions in accordance with an exemplary embodiment of the present disclosure.

FIG. 4 is a flow chart of an algorithm 400 for using detected motions to perform selected functions in accordance with an exemplary embodiment of the present disclosure. Algorithm 400 can be implemented in hardware or a suitable combination of hardware and software, such as using one or more software systems operating as firmware in conjunction with the operating system of a television system, audio system or other suitable systems.

Algorithm 400 begins at 402, where a user prompt is generated. In one exemplary embodiment, the user prompt can allow a user to select a motion-related control for an associated audio system. In this exemplary embodiment, a television monitor, computer monitor, or other suitable audio device can be used to generate a prompt to allow a user to select a motion-related control, such as to reduce or increase a volume setting when motion is detected, to activate a video or audio recorder when motion is detected, or other suitable controls. In another exemplary embodiment, a user can select a motion-related control for a different system, such as a climate control device for an automobile, where the audio system for the automobile is used to monitor whether a door or window of the automobile has been opened. The algorithm then proceeds to 404.

At 404, it is determined whether the user has selected a motion-related control. If it is determined that no motion-related control has been selected, the algorithm returns to 402, otherwise the algorithm proceeds to 406 where a response to the motion control is configured. In one exemplary embodiment, the response can include activation of a video or audio recorder, increase or decrease of an audio setting, activation or deactivation of a climate control system, additional controls such as confirmatory commands entered verbally or using a remote control, or other suitable responses. In one exemplary embodiment, a follow-up prompt can be generated, such as to request that the user confirm that an audio setting should be increased or decreased, to request the user to prevent the system from terminating a current program (such as to turn off a television when a user leaves the room), or other suitable follow-up prompts. The algorithm then proceeds to 408, where the setting is stored in a suitable data memory device, and the algorithm returns to 402.

In operation, algorithm 400 allows a user control to be configured to allow the user to use a motion sensor to perform additional system functions, either with or without additional action by the user. Algorithm 400 thus allows a motion detector for a television, audio system, automobile or other suitable systems to be configured to provide motion-related control functionality.

An example of an algorithm that can be used to determine movement and proximity of movement is given as follows. In an acoustic echo canceller with an impulse response h[n], n=0, . . . , N−1, where the echo canceller can be either a time domain echo canceller or frequency domain echo canceller, the impulse response of the echo canceller can be saved at a first point in time. Next, the following is measured:

$$\Delta_i = \sum_{n=L_i}^{L_{i+1}} (h_s(n) - h_n(n))^2, \; i = 0, \ldots, k$$

where k is a positive integer, $L_i = \alpha_i$ and where $\alpha_i \in [0, N-1]$. The $\Delta_i$ are changes in a segment of an echo path corresponding to an echo path of specific distance. To detect movement, the following measure can be performed:

$$M = \sum_{i=0}^{k} \Delta_i$$

A movement detection can be triggered when M>T, where T is a threshold that will depend on the actual system. The relative changes of $\Delta_i$, i=0, . . . , k can be used to determine the proximity of the movement. If movement is close to the device, the change in all $\Delta_i$ will be of greater magnitude than when the movement is a further distance, in which case the change in the first components of $\Delta_i$ will be of lower magnitude. Define $$M_i = \sum_{l=0}^{i} \frac{\Delta_i}{M} \quad i = 0, \ldots, k$$

Also, define $T_i \in [0,1]$, i=0, . . . , k, where $$\sum_{i=1}^{k} T_i = 1$$

and $$T_0 < T_1 < \ldots < T_k$$

Now, find the largest r such that $$M_i < T_i \text{ for } i=0, \ldots, r$$

The proximity of the movement can then be determined as a distance $D_r$ from a set of predetermined distances from the device $D_i$, i=0, . . . , k where $$D_0 < D_1 < \ldots < D_k$$

The selection of k, $L_i$, $T_i$, T and $D_i$ can be a function of the system design.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for detecting motion comprising:
a first speaker;
a first microphone separated from the first speaker by a distance D1, the first microphone configured to receive a first input audio signal;
a sound generator configured to generate a first output audio signal at the first speaker;
an echo canceller configured to cancel the first output audio signal from the received first input audio signal by determining one or more echo canceller parameters to estimate the generated first output audio signal; and
an echo parameter monitor, wherein the echo parameter monitor stores two or more sequential echo canceller parameters received from the echo canceller and generates a motion indicator if the two or more sequential echo canceller parameters indicate a change in an acoustic echo path that exceeds a predetermined threshold.

2. The system of claim 1 further comprising a second speaker separated from the first microphone by a distance D2, wherein D1 is different from D2;
wherein the sound generator is further configured to generate a second output audio signal at the second speaker; and
wherein the echo canceller is further configured to cancel the second output audio signal from the received first input audio signal by determining one or more echo canceller parameters to estimate the generated second output audio signal.

3. The system of claim 2, wherein D1 is substantially equal to D2.

4. The system of claim 1 further comprising a second microphone separated from the first speaker by a distance D3, wherein D1 is different from D3;
wherein the second microphone is configured to receive a second input audio signal; and
wherein the echo canceller is further configured to cancel the first output audio signal from the received second input audio signal by determining one or more echo canceller parameters to estimate the generated first output audio signal.

5. The system of claim 4 wherein D1 is substantially equal to D3.

6. The system of claim 1 further comprising:
a second speaker separated from the first microphone by a distance D2, wherein D1 is different from D2; and
a second microphone separated from the first speaker by a distance D3, where D3 is different from D1 and D2.

7. The system of claim 1 further comprising:
a second speaker separated from the first microphone by a distance D2, wherein D1 is substantially equal to D2; and
a second microphone separated from the first speaker by a distance D3, where D3 is different from D1 and D2.

8. The system of claim 1 further comprising:
a second speaker separated from the first microphone by a distance D2, wherein D1 is different from D2; and
a second microphone separated from the first speaker by a distance D3, where D3 is different from D1 and D2, and separated from the second speaker by a distance D4, where D4 is different from D3.

9. The system of claim 1 further comprising:
a second speaker separated from the first microphone by a distance D2, wherein D1 is substantially equal to D2; and
a second microphone separated from the first speaker by a distance D3, where D3 is different from D1 and D2, and separated from the second speaker by a distance D4, where D4 is different from D3.

10. The system of claim 1, wherein the echo canceller has an impulse response $h[n]$, $n=0, \ldots, N-1$, wherein the motion indication is generated if $$M > T,$$

where $$M = \sum_{i=0}^{k} \Delta_i \text{ and}$$

$$\Delta_i = \sum_{n=L_1}^{L_{i+1}} (h_s(n) - h_n(n))^2, i = 0, \ldots, k,$$

where k is a positive integer, $L_1 = \alpha_i$ and $\alpha_i \epsilon [0, N-1]$.

11. A method for detecting motion using an audio device, comprising:
generating an output audio signal through a speaker of the audio device;
receiving an input audio signal at a microphone of the audio device;
cancelling the generated output audio signal from the received input audio signal, wherein the cancelling includes estimating the generated output audio signal by measuring a first echo parameter of the received input audio signal at a first time interval;
storing the first echo parameter in the audio device;
measuring a second echo parameter of the received input audio signal at a second time interval;
storing the second echo parameter in the audio device; and
generating a motion detection signal if the first echo parameter is different from the second echo parameter by more than a predetermined amount.

12. The method of claim 11 wherein the first echo parameter and the second echo parameter are generated using a nonlinear echo processor.

13. The method of claim 11 wherein the first echo parameter and the second echo parameter are generated using an adaptive linear filter.

14. The method of claim 11 wherein the echo canceller has an impulse response $h[n]$, $n=0, \ldots, N-1$.

15. The method of claim 14, further comprising determining $$\Delta_i = \sum_{n=L_1}^{L_{i+1}} (h_s(n) - h_n(n))^2, i = 0, \ldots, k,$$

where k is a positive integer, $L_1 = \alpha_i$ and $\alpha_i \epsilon [0, N-1]$.

16. The method of claim 15 further comprising determining $$M = \sum_{i=0}^{k} \Delta_i,$$

wherein the motion detection signal is generated if
M>T,
where T is a predetermined threshold.

17. The method of claim 16 further comprising determining a proximity of movement based on a relative change of $\Delta_i$ for i=0, . . . k.

18. A system for detecting motion comprising:
a sound generator configured to generate an output signal through a loudspeaker;
a microphone configured to receive an input signal including the generated output signal;
an echo canceller configured to estimate and cancel the generated output signal from the received input signal, the echo canceller determining at least one echo parameter; and
an echo parameter monitor configured to generate a motion indicator if the two or more sequential echo parameters indicate a change in an acoustic echo path that exceeds a predetermined threshold.

19. The system of claim 18 wherein the system for detecting motion is an automobile audio system and the motion indicator identifies whether a window is opened or closed.

20. The system of claim 19 wherein the system modifies a setting of a climate control system.

* * * * *